(12) United States Patent
Ihara (10) Patent No.: US 8,363,890 B2
(45) Date of Patent: Jan. 29, 2013

(54) IMAGE PROCESSING APPARATUS, IMAGE PROCESSING METHOD AND NON-TRANSITORY COMPUTER-READABLE MEDIUM

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 308 days.

(21) Appl. No.: 12/894,986

(22) Filed: Sep. 30, 2010

(65) Prior Publication Data

US 2011/0206233 A1 Aug. 25, 2011

(30) Foreign Application Priority Data

Feb. 23, 2010 (JP) ................................ 2010-037636

(51) Int. Cl.
*G06K 9/00* (2006.01)
(52) U.S. Cl. ........................................................ 382/100
(58) Field of Classification Search .................. None
See application file for complete search history.

(56) References Cited

U.S. PATENT DOCUMENTS

| | | | | |
|---|---|---|---|---|
| 5,915,027 A * | 6/1999 | Cox et al. | .......................... | 380/54 |
| 6,332,194 B1 * | 12/2001 | Bloom et al. | .................. | 713/176 |
| 6,374,036 B1 * | 4/2002 | Ryan et al. | ..................... | 386/261 |
| 6,804,372 B1 * | 10/2004 | Kondo et al. | ................. | 382/100 |
| 6,804,452 B1 * | 10/2004 | Kuroda et al. | ................ | 386/252 |
| 6,870,944 B1 * | 3/2005 | Kondo et al. | ................. | 382/100 |
| 6,945,455 B2 * | 9/2005 | Kobayashi et al. | ............ | 235/375 |
| 7,055,034 B1 * | 5/2006 | Levy | .............................. | 713/176 |
| 7,065,226 B1 * | 6/2006 | Anzai et al. | .................... | 382/100 |
| 7,149,324 B2 * | 12/2006 | Tanaka | .......................... | 382/100 |
| 7,630,514 B2 * | 12/2009 | Hara | .............................. | 382/100 |
| 8,027,507 B2 * | 9/2011 | Levy | .............................. | 382/100 |
| 8,045,754 B2 * | 10/2011 | Maeno | .......................... | 382/100 |
| 2002/0126996 A1 * | 9/2002 | Kuroda | .......................... | 386/94 |
| 2005/0018873 A1 * | 1/2005 | Rhoads | .......................... | 382/100 |
| 2007/0092106 A1 * | 4/2007 | Sakazawa et al. | ............ | 382/100 |
| 2007/0188817 A1 | 8/2007 | Noguchi | | |

FOREIGN PATENT DOCUMENTS

| | | |
|---|---|---|
| JP | 2007-215123 A | 8/2007 |
| JP | 2010-062697 A | 3/2010 |

\* cited by examiner

*Primary Examiner* — Claire X Wang
*Assistant Examiner* — Sean Conner
(74) *Attorney, Agent, or Firm* — Sughrue Mion, PLLC (57) ABSTRACT

An image processing apparatus includes an image acquiring unit, a partial information detecting unit and an embedding unit. The image acquiring unit acquires an image in which first additional information is embedded so that pieces of first partial information obtained by dividing the first additional information are coded and embedded in respective unit areas obtained by dividing the image. The partial information detecting unit detects the pieces of first partial information, which are embedded in the respective unit areas of the image acquired by the image acquiring unit. The embedding unit codes and embeds, in the respective unit areas, pieces of second partial information obtained by dividing second additional information which is different from the first additional information so that a sum of differences between corresponding pairs of (i) the pieces of detected first partial information and (ii) the newly embedded pieces of second partial information become minimum.

10 Claims, 8 Drawing Sheets

The digital watermark is attracting much attention as a copyright protection method to be used in distributing digital data of an image, audio, or the like on the Internet.

IMAGE PROCESSING APPARATUS, IMAGE PROCESSING METHOD AND NON-TRANSITORY COMPUTER-READABLE MEDIUM

CROSS-REFERENCE TO RELATED APPLICATIONS

This application is based on and claims priority under 35 USC 119 from Japanese Patent Application No. 2010-37636 filed on Feb. 23, 2010.

BACKGROUND

1. Technical Field

The present invention relates to an image processing apparatus, an image processing method and a non-transitory computer-readable medium storing a program that causes a computer to execute image processing.

2. Related Art

Among various methods for adding, to an image, additional information relating to the image, there is one technique of generating a code image representing additional information and embedding the generated code image in a subject image.

SUMMARY

According to an aspect of the invention, an image processing apparatus includes an image acquiring unit, a partial information detecting unit and an embedding unit. The image acquiring unit acquires an image in which first additional information is embedded in such a manner that pieces of first partial information obtained by dividing the first additional information are coded and embedded in respective unit areas obtained by dividing the image. The partial information detecting unit detects the pieces of first partial information, which are embedded in the respective unit areas of the image acquired by the image acquiring unit. The embedding unit codes and embeds, in the respective unit areas, pieces of second partial information obtained by dividing second additional information which is different from the first additional information so that a sum of differences between corresponding pairs of (i) the pieces of first partial information detected by the partial information detecting unit and (ii) the newly embedded pieces of second partial information become minimum.

BRIEF DESCRIPTION OF THE DRAWINGS

Exemplary embodiments of the invention will be described in detail below based on the accompanying drawings, wherein.

DETAILED DESCRIPTION

Exemplary embodiments of the present invention will be hereinafter described in detail with reference to the accompanying drawings.

Figure 1:
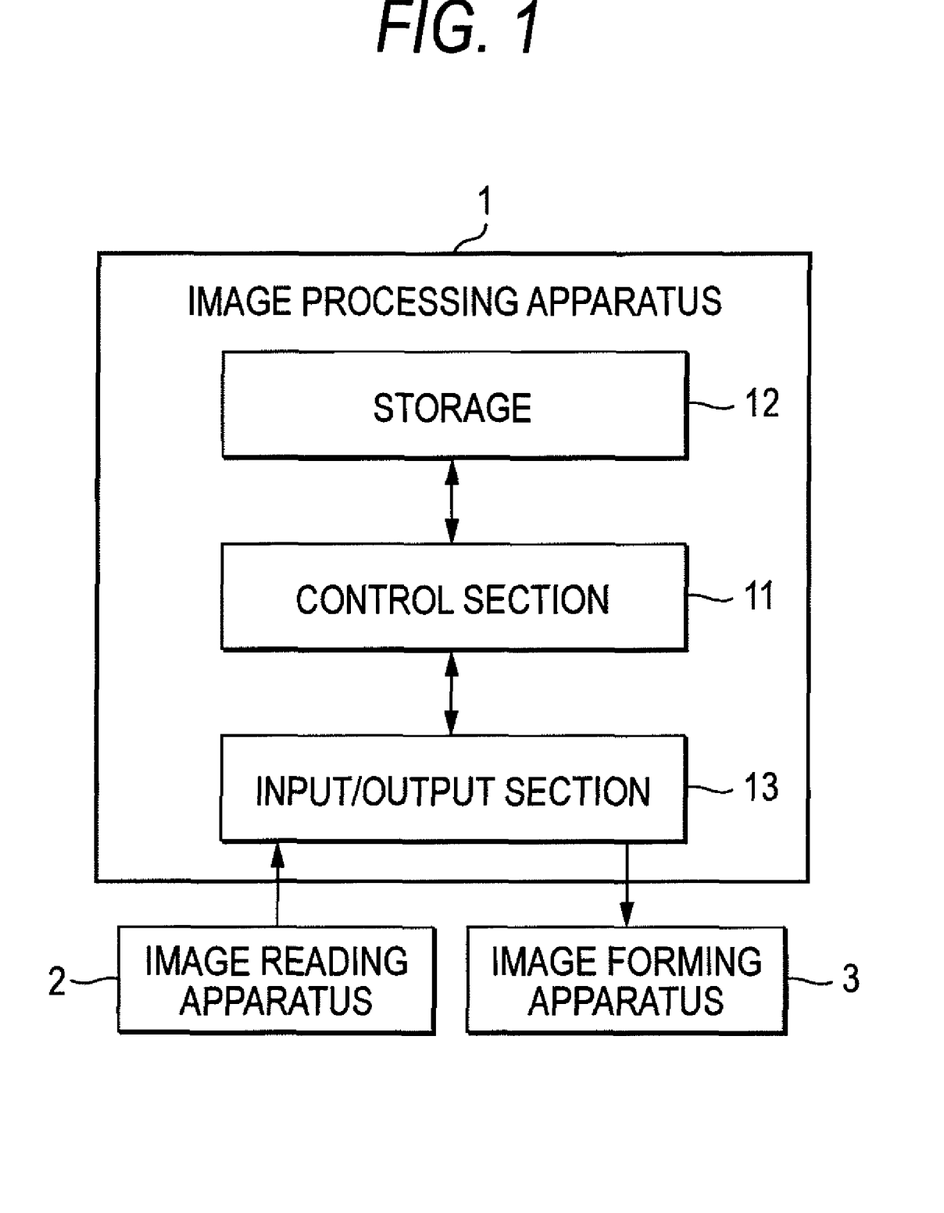
FIG. 1 is a block diagram showing a general configuration of an image processing apparatus according to an exemplary embodiment of the present invention.

FIG. 1 is a block diagram showing a general configuration of an image processing apparatus 1 according to the exemplary embodiment. The image processing apparatus 1 according to the exemplary embodiment includes a control section 11, a storage 12, and an input/output section 13. An image reading apparatus 2 and an image forming apparatus 3 are connected to the image processing apparatus 1 through the input/output section 13.

The control section 11, which is a program-based control device such as a CPU, performs various kinds of information processing according to programs that are stored in the storage 12. In the exemplary embodiment, the control section 11 performs processing of detecting additional information embedded in image data (processing subject) and embedding other (new) additional information in the image (i.e., updating the additional information embedded in the image). Specific example processes that are executed by the control section 11 will be described later.

The storage 12, which includes a memory device such as a RAM and a ROM, stores programs to be run by the control section 11 and various data. The storage 12 also functions as a working memory of the control section 11.

The input/output section 13 is a communication interface for exchanging data with the image reading apparatus 2 and the image forming apparatus 3. The image reading apparatus 2, which is a scanner, for example, reads an image formed on a recording medium such as a sheet of paper and outputs data of the read-out image to the image processing apparatus 1 via the input/output section 13. The image forming apparatus 3, which is a printer, for example, forms, on a recording medium such as a sheet of paper, an image that is input from the image processing apparatus 1 via the input/output section 13.

In the exemplary embodiment, the image reading apparatus 2 reads an image in which additional information is embedded as a code image and outputs data of the read-out image to the image processing apparatus 1. The term "additional information" means information that is added to an image. In the following description, an image that is input from the image reading apparatus 2 and serves as a processing subject of the image processing apparatus 1 may be referred to as an "input image I1". Additional information that is embedded in the input image I1 may be referred to as "first additional information A1". An image in which additional information has not been embedded yet may be referred to as an "original image Io". That is, an input image I1 is generated by combining an original image Io with a code image that represents the contents (bit string) of first additional information A1.

After detecting the first additional information A1, which is embedded in the input image I1, the image processing apparatus 1 generates an image in which new additional information (hereinafter referred to as "second additional information A2") is embedded as a code image, that is, an image as obtained by embedding the new additional information in the original image Io. That is, the image processing apparatus 1 erases the code image, which represents the first additional information A1 and is embedded in the input image I1, and generates the image in which a code image representing the second additional information A2 is embedded instead. In the following, the image in which the second additional information A2 is embedded may be referred to as an "output image I2". The image processing apparatus 1 outputs the output image I2 to the image forming apparatus 3. In response, the image forming apparatus 3 forms the output image I2 on a recording medium such as a sheet of paper.

In the exemplary embodiment, the second additional information A2 is information that is different in contents from the first additional information A1. The second additional information A2 may be such as to be generated based on the contents of the first additional information A1, which is detected from the input image I1. For example, to manage the number of times an original image Io is copied using additional information, additional information representing the number of times of the copying is embedded in the original image Io. When acquiring data of an input image I1 that has been read by the image reading apparatus 2, the image processing apparatus 1 detects first additional information A1 embedded therein. Then, the image processing apparatus 1 generates an output image I2 in which a number obtained by adding 1 to the number of times of the copying represented by the first additional information A1 is embedded as second additional information A2, and outputs the generated output image I2 to the image forming apparatus 3. With this operation, 1 is added to the number of times of the copying, which is the additional information embedded in the original image Io, every time the image forming apparatus 3 performs copying processing of forming an image read by the image reading apparatus 2 on a recording medium.

Figure 2:
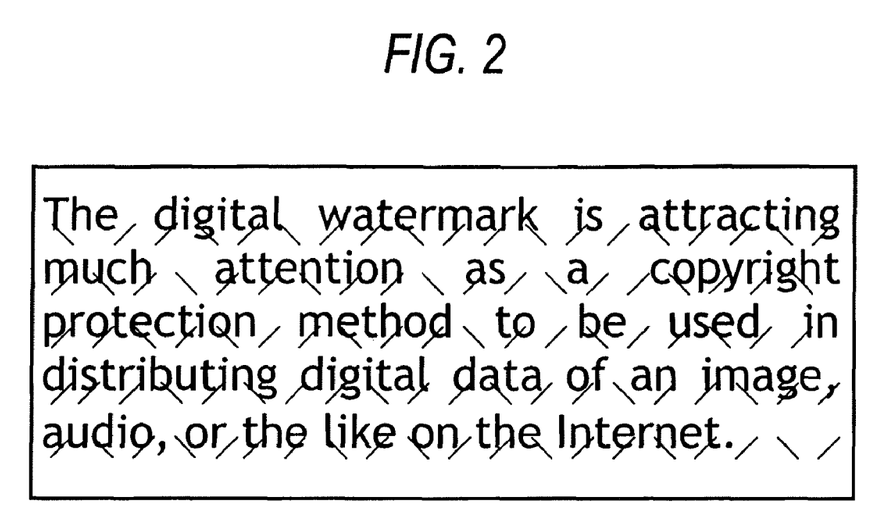
FIG. 2 shows an example input image in which first additional information is embedded.

A description will now be made of how additional information is embedded in an original image Io in the exemplary embodiment. In the exemplary embodiment, additional information is embedded in an original image Io by arranging plural image elements in the original image Io according to a prescribed rule. The term "image element" means each of elements that constitute a code image, and each image element corresponds to 1 bit. Each image element represents "1" or "0" depending on its presence/absence, shape, arrangement position, or the like. Various image element patterns representing a bit string have been proposed. For example, in the method called "glyph pattern," an oblique line image extending top-right to bottom-left represents "1" and an oblique line image extending top-left to bottom-right represents "0." A bit string consisting of 0s and 1s is embedded in an original image Io by arranging the oblique line images representing "0" or "1" at constant intervals in the original image Io. FIG. 2 shows an example input image I1 obtained by embedding such a code image in an original image Io which is a document image. Another method for embedding additional information in an original image Io is a method in which "1" or "0" is expressed by presence/absence of a dot. In this method, presence and absence of a dot (dot image) at each of arrangement positions that are set at constant intervals in an original image Io represents "1" and "0," respectively. In methods as described above in which image elements are correlated with respective bits constituting additional information, additional information that is embedded in an original image Io can be updated bit by bit by rewriting individual bits arranged in the original image Io.

Furthermore, in the exemplary embodiment, additional information is divided into plural pieces of information having a predetermined size each of which is embedded in one of plural divisional areas (hereinafter may be referred to as "unit areas Iu") of an original image Io. That is, information of a predetermined number of bits that constitutes a part of first additional information A1 is embedded in each unit area Iu of an original image Io. Each of plural pieces of information that are generated by dividing first additional information A1 into portions having the predetermined number of bits may be referred to as "first partial information A1$p$". Where n pieces of first partial information A1$p$ are generated from first additional information A1, they are denoted by A1$p$(1), A1$p$(2), . . . , A1$p$(n) in order from the first one, where n is an integer that is larger than or equal to 2.

More specifically, to embed first additional information A1 in an original image Io, first, the first additional information A1 is generated by adding an error correction code (CRC code, checksum, or the like) to information to be embedded. Then, the first additional information A1 is divided into portions having the predetermined number of bits. Then, pieces of identification information (sequence numbers) that enable identification of the positions (order), in the first additional information A1, of the respective divisional portions of the first additional information A1 are added to the respective divisional portions. Finally, pieces of first partial information A1$p$ are generated by adding error correction codes to the pieces of information added with the respective pieces of identification information. The error correction code that is used in generating pieces of first partial information A1$p$ may be the BCH code, for example. The thus-generated pieces of first partial information A1$p$ having the pieces of identification information are embedded in the respective unit areas Ip of the original image Io.

Figure 3:
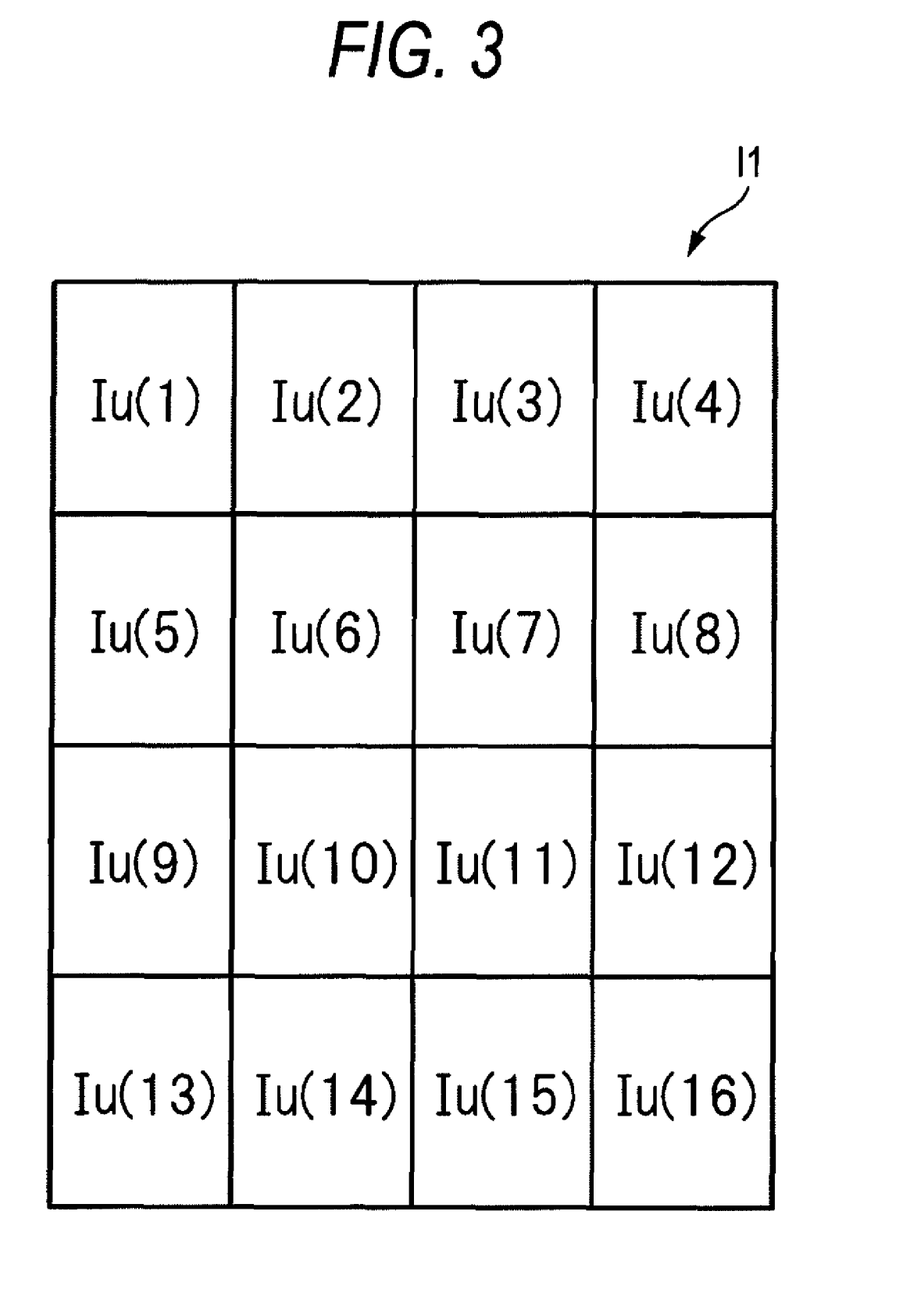
FIG. 3 shows an example of unit areas that are defined in an input image.

FIG. 3 schematically shows an input image I1 which contains plural unit areas Iu in which respective pieces of first partial information A1$p$ are embedded. In the example of FIG. 3, an original image Io is divided in lattice form by three straight lines extending in the horizontal direction and three straight lines extending in the vertical direction, whereby 4-row/4-column (16 in total) unit areas Iu(1) to Iu(16) are defined.

Pieces of first partial information A1$p$(1), A1$p$(2), . . . , A1$p$(n) are embedded in the unit areas Iu(1), Iu(2), . . . , Iu(n), respectively.

Figure 4:
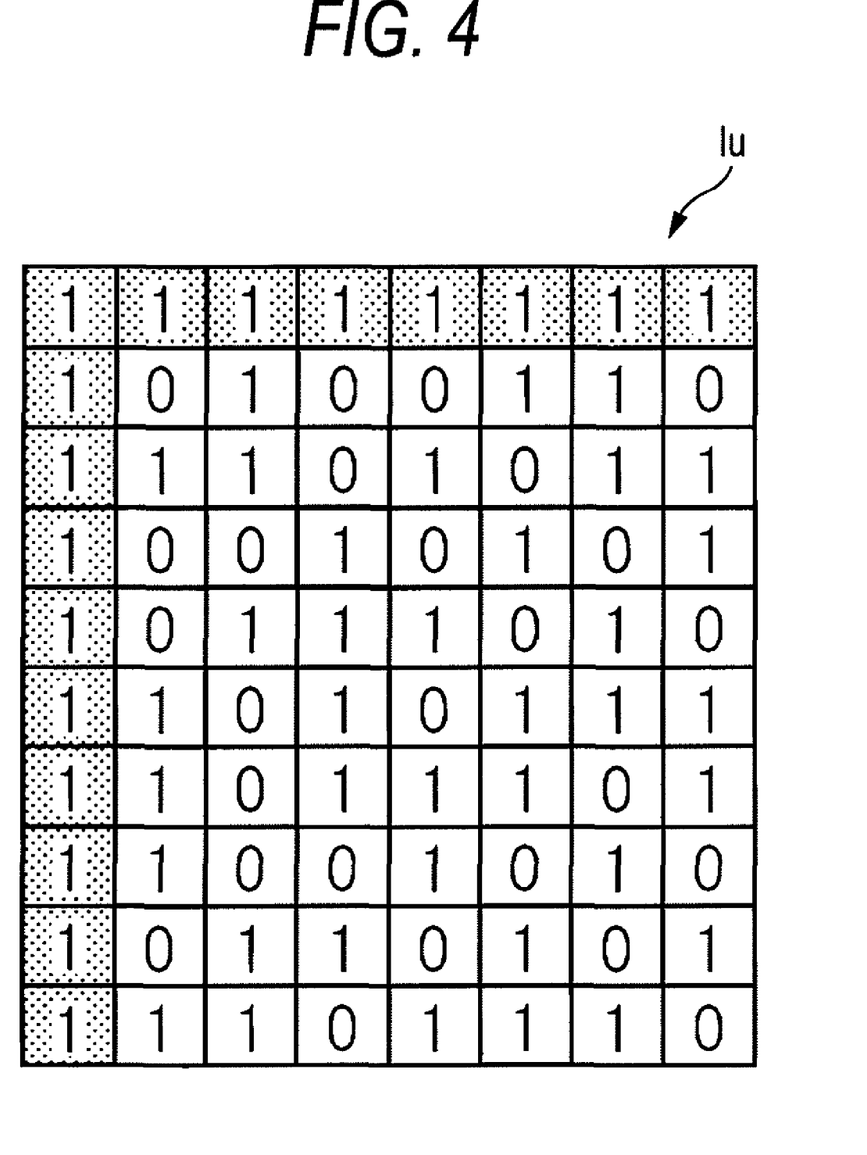
FIG. 4 shows an example of a sync signal region that is set in each unit area.

To allow the image processing apparatus 1 to specify the position, in the original image Io, of each unit area Iu, each unit area Iu is provided with a sync signal region. The sync signal region is provided along the periphery of each unit area Iu, and a sync signal is embedded in the sync signal region. FIG. 4 shows an example of the sync signal region. FIG. 4 schematically shows bits that are represented by respective image elements that are embedded in one unit area Iu. In the example of FIG. 4, image elements representing "1" are embedded in the sync signal region (hatched in FIG. 4), which extends along the top line and the left sideline of the unit area Iu. Image elements representing "1" or "0" are regularly arranged in the other part of the unit area Iu and thereby represent the contents of first additional information A1. The image processing apparatus 1 first determines the positions of respective unit regions Iu that are set in an input image I1 by detecting sync signal regions from the input image I1, and then detect pieces of first partial information A1$p$ that are embedded in the respective unit regions Iu. Alternatively, instead of sync signal regions, marks or the like indicating the positions of unit areas Iu may be arranged in an input image I1 by another method. For example, marker images may be formed with invisible ink or the like at the four corners of each unit area Iu. The position of each unit area Iu can be specified using the marker images.

Figure 5:
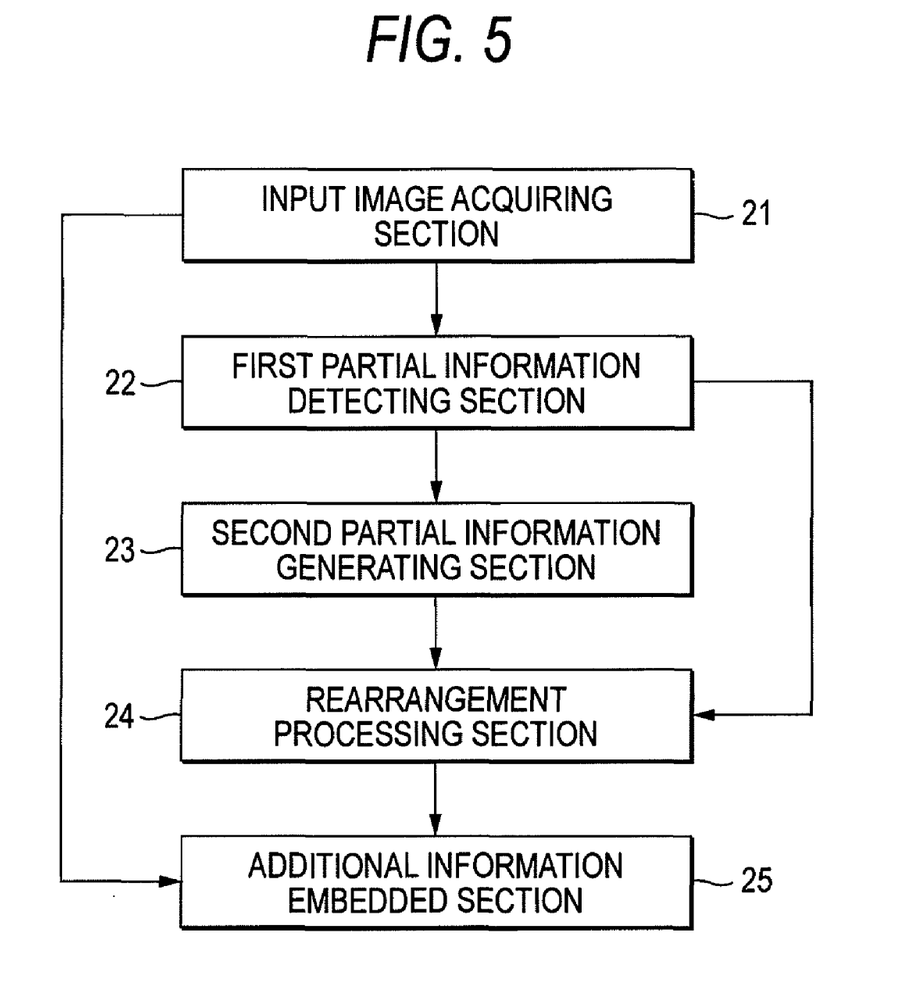
FIG. 5 is a functional block diagram showing functions that are realized by the image processing apparatus according to the exemplary embodiment of the invention.

Next, functions that are realized by the image processing apparatus 1 will be described. In terms of function, as shown in FIG. 5, the image processing apparatus 1 includes an input image acquiring section 21, a first partial information detecting section 22, a second partial information generating section 23, a rearrangement processing section 24, and an additional information embedding section 25. The functions of these sections are realized in such a manner that the control section 11 runs the programs, which are stored in the storage 12. The image processing apparatus 1 may be supplied with the programs in such a manner as to be stored in any of computer-readable information storage media such as an optical disc or over a communication line such as the Internet.

The input image acquiring section 21 acquires data of an input image I1 that is input from the image reading apparatus 2. The acquired data of the input image I1 is temporarily stored in a working memory area of the storage 12.

The first partial information detecting section 22 detects pieces of first partial information A1$p$ that are embedded in respective unit areas Iu of the input image I1 acquired by the input image acquiring section 21. More specifically, the first partial information detecting section 22 determines positions of the unit areas Iu of the input image I1. Then, the first partial information detecting section 22 detects code images that are embedded in the respective unit areas Iu, and decodes the bit sequences of the code images into pieces of first partial information A1$p$. Then, the first partial information detecting section 22 performs error correction processing using error correction codes that are provided in the respective pieces of first partial information A1$p$. The pieces of first partial information A1$p$, which have been detected from the respective unit areas Iu and subjected to the error correction processing, are concatenated to each other in order, whereby first additional information A1 that was embedded in the input image I1 is restored. Like pieces of second partial information A2$p$ (which will be described later), there may be a case where pieces of first additional information A1$p$ are be embedded in an input image I1 in such a manner as to be changed in arrangement order. In such a case, first additional information A1 is restored by concatenating the pieces of first partial information A1$p$ to each other after rearranging them according to pieces of identification information contained therein.

The second partial information generating section 23 generates second additional information A2 to be newly embedded in the input image I1. For example, the second additional information A2 may be information that is obtained by adding an error correction code such as a CRC code to information which is generated based on the first additional information A1 obtained by the first partial information detecting section 22. As in the case of the first additional information A1, the second partial information generating section 23 generates pieces of second partial information A2$p$ by dividing the second additional information A2 into plural portions having a prescribed number of bits. This number of bits may be the same as the number of bits of each of the pieces of first partial information A1$p$ that were generated from the first additional information A1. More specifically, as in the case of generating the pieces of first partial information A1$p$, the second partial information generating section 23 generates pieces of second partial information A2$p$ by adding pieces of identification information indicating positions (order), in the second additional information A2, of respective divisional portions of the second additional information A2 to the respective divisional portions and adding error correction codes to the pieces of information added with the respective pieces of identification information. The thus-generated pieces of second partial information A2$p$ are embedded in the respective unit areas Iu of the input image I1. In the following, where second additional information A2 is divided into m pieces of second partial information A2$p$, they will be denoted by A2$p$(1), A2$p$(2), . . . , A2$p$(m) in order from the first one, where m is an integer that is larger than or equal to 2. The number m need not always be equal to the number n of first partial information A1$p$ embedded in the input image I1. However, it is necessary that the input image I1 be divided into m or more unit areas Iu in advance.

The rearrangement processing section 24 determines an order in which the pieces of second partial information A2$p$ generated by the second partial information generating section 23 are to be embedded in the input image I1 by rearranging the pieces of second partial information A2$p$. In doing so, the rearrangement processing section 24 rearranges the pieces of second partial information A2$p$ so as to reduce, as a whole, the differences between the pieces of information that are currently embedded in the respective unit areas Iu of the input image I1 and the pieces of information to be embedded there. A specific example of the rearrangement processing will be described later. Since the pieces of second partial information A2$p$ are added with the respective pieces of identification information, even if the pieces of second partial information A2$p$ are embedded in the input information I1 after their arrangement order is changed, the original second additional information can be restored by detecting the pieces of second partial information A2$p$ embedded in the respective unit areas Iu and then rearranging them according to the respective pieces of identification information provided therein.

The additional information embedding section 25 embeds, as code images, the pieces of second partial information A2$p$ as rearranged by the rearrangement processing section 24 in the respective unit areas Iu of the input image I1. At this time, the pieces of first partial information A1$p$, which are currently embedded in the input image I1 are erased. The additional information embedding section 25 need not erase all the code images representing the respective pieces of first partial information A1$p$. As described above, each code image consists of plural image elements each corresponding to 1 bit. Therefore, the additional information embedding section 25 may compare the pieces of first partial information A1$p$ currently embedded in the respective unit areas Iu with the pieces of second partial information A2$p$ to be embedded there and update only image elements corresponding to bits whose values will be changed (leave as they are the remaining image elements corresponding to bits whose values will not be changed). This decreases the number of correction portions of the input image I1 and thereby reduces the amount of image processing to be performed in generating an output image I2. Furthermore, in the exemplary embodiment, the rearrangement processing section 24 rearranges the pieces of second partial information A2$p$ so as to reduce the differences between the pieces of information currently embedded in the respective unit areas Iu and the pieces of information to be embedded there. This makes the amount of image update processing that needs to be performed on the input image I1 smaller than in a case that the pieces of second partial information A2p are embedded in the original order (not rearranged). The additional information embedding section 25 outputs, to the image forming apparatus 3, an output image A2 which has been generated by performing the above-described additional information update processing on the input image I1.

A first example rearrangement process which is executed by the rearrangement processing section 24 will be described below with reference to a flowchart of FIG. 6. The following description will be directed to an example case where first additional information A1 is divided into four pieces of first partial information A1p and second additional information A2 is likewise divided into four pieces of second partial information A2p.

First, at step S1, the rearrangement processing section 24 generates possible permutations of pieces of second partial information A2p and assigns permutation numbers to the respective permutations. Since as mentioned above the four pieces of second partial information A2p have been generated by the second partial information generating section 23, the number of permutations of the four pieces of second partial information A2p is 4!=24. These permutations are assigned permutation numbers 0 to 23.

At step S2, the rearrangement processing section 24 initializes a variable (variable i) representing the permutation number of the processing subject permutation to "0." At step S3, the rearrangement processing section 24 compares the whole of a bit string obtained by rearranging the pieces of second partial information A2p according to the permutation having the permutation number that is equal to variable i with the bit string of pieces of first partial information A1p detected by the first partial information detecting section 22 and calculates a difference value Di between the two bit strings. The difference value Di is defined as the number of pairs of bits (difference bits) located at the same position in the two bit strings and having different values (Huffman distance).

At step S4, the rearrangement processing section 24 determines as to whether or not the difference value Di, which was calculated at step S3, is smaller than a current minimum difference value Dmin. The current minimum difference value Dmin is the smallest one of difference values Di of the permutations processed so far. If the difference value Di that was newly calculated at step S3 is smaller than the current minimum difference value Dmin, at step S5 the rearrangement processing section 24 updates the minimum difference value Dmin to the newly calculated difference value Di and stores the current value of variable i in the storage 12 as the permutation number of the permutation that minimizes the difference value Di. When step S3 is executed for the first time, there is no minimum difference value Dmin and hence a calculated difference value Di is stored as the minimum difference value Dmin as it is. If it is determined at step S4 that the difference value Di is larger than or equal to the minimum value Dmin, the process proceeds to step S6 with skipping step S5.

At step S6, the rearrangement processing section 24 increments variable i by 1. At step S7, the rearrangement processing section 24 determines as to whether or not all the permutations, which were assigned the respective permutation numbers at step S1, have been processed. If variable i is not equal to 24, not all of the permutations have been processed and hence the process returns to step S3 to execute the loop again for the next permutation. If all the permutations have been processed, at step S8 the permutation, which produces the current minimum difference value Dmin, is employed as a permutation according to which the pieces of second partial information A2p should be rearranged.

A specific example will be described below. Assume that pieces of first partial information A1p and pieces of second partial information A2p have the following bit strings:

First partial information A1p(1): 001110
First partial information A1p(2): 010001
First partial information A1p(3): 101011
First partial information A1p(4): 111110
Second partial information A2p(1): 001010
Second partial information A2p(2): 011100
Second partial information A2p(3): 100011
Second partial information A2p(4): 110001

Figure 7A:
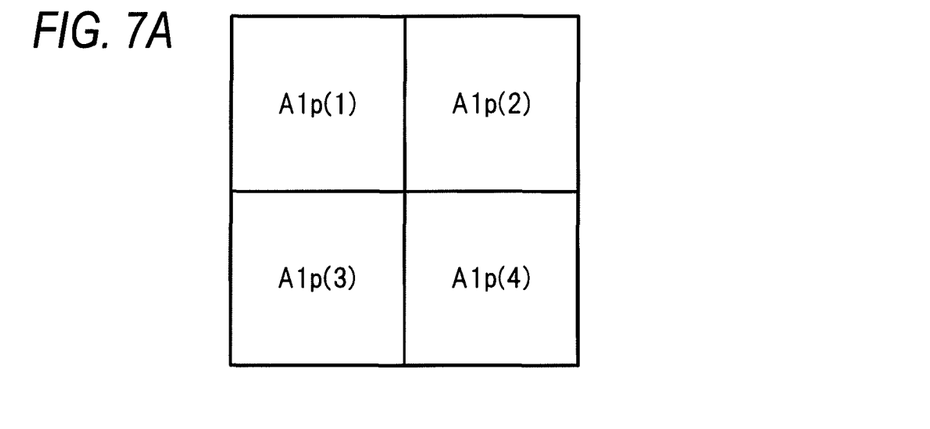
FIG. 7A shows example embedding destinations, in an input image, of respective pieces of first partial information.

Since each of the number of pieces of first partial information A1p and the number of pieces of second partial information A2p is four, it suffices that the identification information for discrimination between the pieces of first partial information A1p or the pieces of second partial information A2p be of 2 bits. In this example, the head 2 bits of each piece of partial information represents identification information. FIG. 7A shows example embedding destinations, in an input image I1, of the four pieces of first partial information A1p(1) to A1p(4).

Figure 7B:
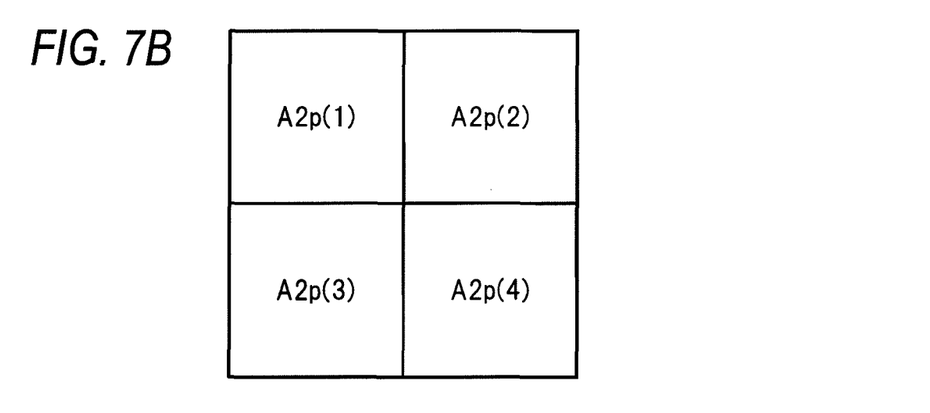
FIG. 7B shows example embedding destinations, in the input image, of respective pieces of second partial information in a case where they are not rearranged.
Figure 7C:
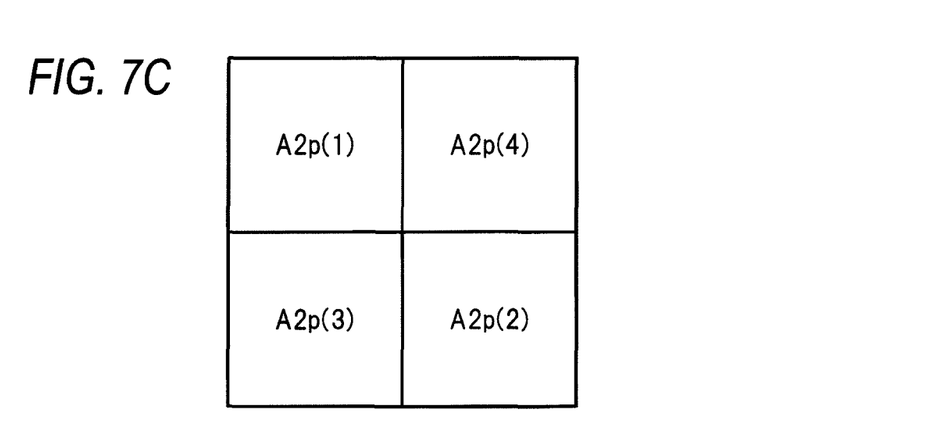
FIG. 7C shows example embedding destinations, in the input image, of the respective pieces of second partial information in a case where they are rearranged.

In this example, where the pieces of second partial information A2p are embedded in the input image I1 as they are (i.e., without being rearranged), one difference bit exists between the first partial information A1p(1) and the second partial information A2p(1), three difference bits exist between the first partial information A1p(2) and the second partial information A2p(2), one difference bit exists between the first partial information A1p(3) and the second partial information A2p(3), and four difference bits exist between the first partial information A1p(4) and the second partial information A2p(4). Therefore, the difference value Di of this permutation is calculated as "9", and the image elements corresponding to these difference bits need to be rewritten. FIG. 7B shows embedding destinations, in the input image I1, of the four pieces of second partial information A2p(1) to A2p(4) in the case where they are embedded there as they are (i.e., without being rearranged). In contract, where the pieces of second partial information A2p are rearranged so as to have order of A2p(1), A2p(4), A2p(3), and A2p(2), one difference bit exists between the first partial information A1p(1) and the second partial information A2p(1), one difference bit exists between the first partial information A1p(2) and the second partial information A2p(4), one difference bit exists between the first partial information A1p(3) and the second partial information A2p(3), and two difference bits exist between the first partial information A1p(4) and the second partial information A2p(2). The difference value Di of this permutation is calculated as "5" which is the minimum. Therefore, the number of image elements to be rewritten is reduced if the pieces of second partial information A2p are embedded in the respective unit areas Iu after being rearranged according to this permutation. FIG. 7C shows embedding destinations, in the input image I1, of the four pieces of second partial information A2p(1) to A2p(4) in the case where they are rearranged in the above-described manner.

Figure 6:
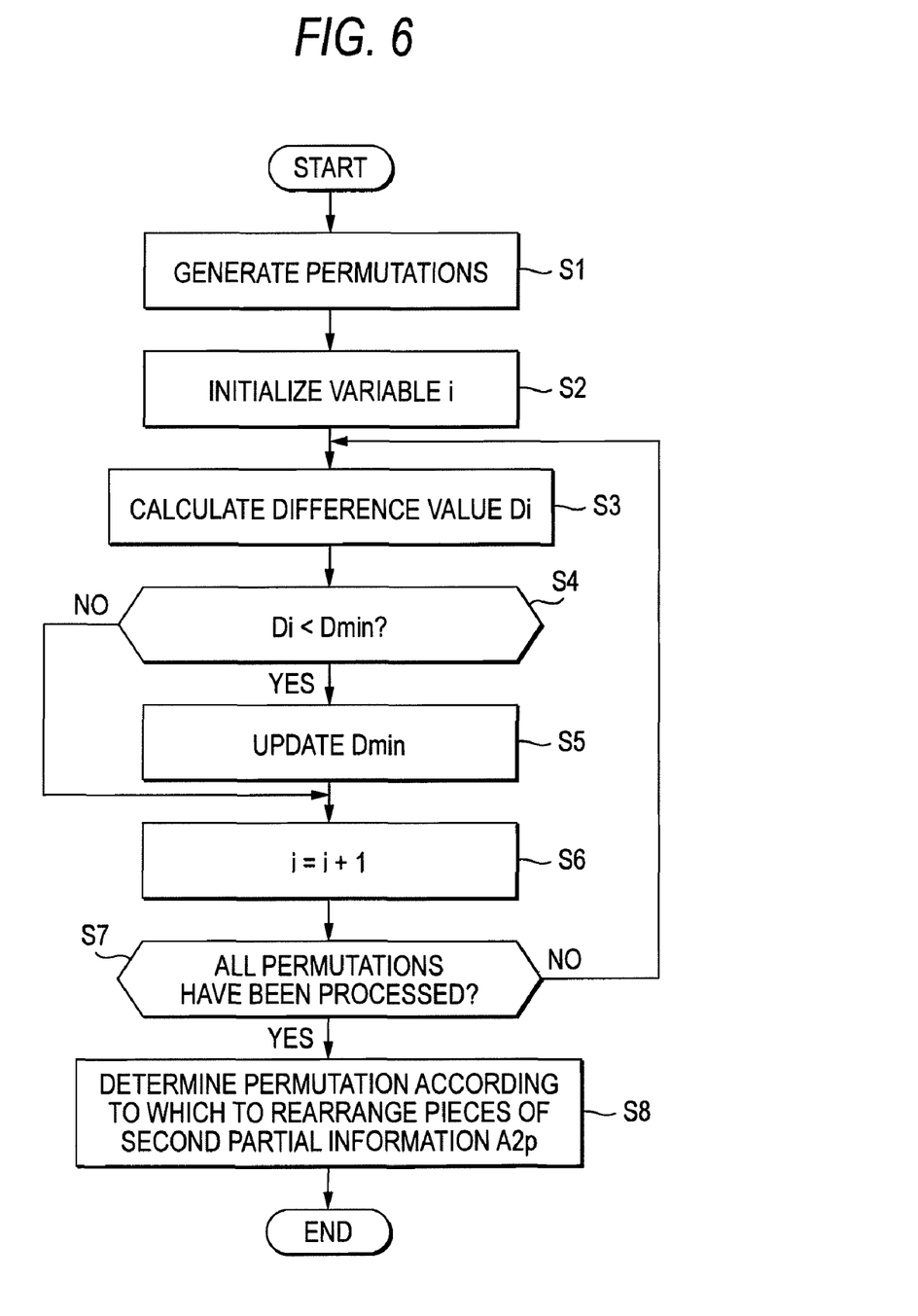
FIG. 6 is a flowchart of an example process that is executed by the image processing apparatus according to the exemplary embodiment of the invention.

As described above, in the first example rearrangement process of FIG. 6, a difference value Di between pieces of information currently embedded in an input image I1 and pieces of information to be embedded there is calculated for every permutation of pieces of second partial information A2p, and a permutation that produces a smallest difference value Di is determined. The number of bits to be updated can thus be minimized.

Although in the process of FIG. 6 a difference value Di is calculated for every permutation and a permutation that produces a smallest difference value Di is determined, the rearrangement processing section 24 need not always calculate a difference value Di for every permutation. For example, the process of FIG. 6 may be modified in the following manner. After execution of step S3, it may be determined as to whether or not the calculated difference value Di is smaller than or equal to a predetermined reference value. If the calculated difference value Di is smaller than or equal to the predetermined reference value, the pieces of second partial information A2p are rearranged according to the permutation, which produces the current difference value Di. The process is finished at this stage. With this procedure, a permutation that produces a sufficiently small difference value Di can be selected even though a difference value Di is not necessarily calculated for every permutation.

The process of FIG. 6 may also be modified in the following manner. For each of a part of the all pieces of second partial information A2p, the rearrangement processing section 24 selects in order a piece of first partial information A1p that produces a smallest difference among pieces of first partial information A1p for which no corresponding piece of second partial information A2p have been determined yet. For the remaining pieces of second partial information A2p, the rearrangement processing section 24 determines a permutation that produces a smallest difference value Di according to the process of FIG. 6. More specifically, for a half (m/2) of m pieces of second partial information A2p, corresponding pieces of first partial information A1p are selected one by one in order. In the above-described example of the four pieces of first partial information A1p and the four pieces of second partial information A2p, for the second partial information A2p(1), since the first partial information A1p(1) produces a smallest difference value Di of "1" among the four pieces of first partial information A1p, it is determined that the second partial information A2p(1) should be embedded in the unit area Iu where the first partial information A1p(1) is currently embedded. Then, the second partial information A2p(2) is correlated with the first partial information A1p(4) which produces a smallest difference value Di among the pieces of first partial information A1p(2), A1p(3), and A1p(4) excluding the first partial information A1p(1) for which the corresponding piece of second partial information A2p has already been determined. Subsequently, for each of the remaining pieces of second partial information A2p(3) and A2p(4), a corresponding piece of first partial information A1p is determined from the remaining pieces of first partial information A1p(2) and A1p(3) according to the process of FIG. 6. With this procedure, a permutation that produces a relatively small difference value Di can be selected even though a difference value Di is not necessarily calculated for every permutation of the m pieces of second partial information A2p.

Next, a second example rearrangement process which is executed by the rearrangement processing section 24 will be described.

In the second example, in detecting, in advance, pieces of first partial information A1p that are embedded in an input image I1, the first partial information detecting section 22 also detects restricted portions where a change should be restricted. The term "restricted portion where a change should be restricted" means a portion where a value is difficult to delete or change because, for example, the image element representing that portion overlaps with an image element of an original image Io. For example, in the input image I1 of FIG. 2, there are locations where an oblique line image as an image element of the additional information overlaps with a character image of the original image Io. Some of those oblique line images would be difficult to rewrite. Since whether or not the portion concerned is a restricted portion where a change should be restricted is determined for each of the pixel elements constituting a code image, a restricted portion where a change should be restricted is determined for each of the bits constituting each piece of first partial information A1p. Therefore, in the following, a 1-bit restricted portion where a change should be restricted will be referred to as a "change-restricted bit."

More specifically, for an image containing each image element (1 bit) of first additional information A1 and a region around the image element, the first partial information detecting section 22 performs image processing of rewriting a detected bit value (0 or 1) to the other value. That is, if detecting an image element representing "0," the first partial information detecting section 22 performs image processing of deleting this image element and combining an image element representing "1" with the other part of the first additional information A1. If detecting an image element representing "1," the first partial information detecting section 22 performs image processing of deleting this image element and combining an image element representing "0" with the other part of the first additional information A1. Then, the first partial information detecting section 22 determines as to whether or not the bit-value-rewritten image element is detected correctly. If the bit-value-rewritten image element is not detected correctly, the first partial information detecting section 22 determines that this image element is a change-restricted bit.

If the above processing were performed on all the bits constituting the first additional information A1, the amount of necessary image processing would be large. In view of this, the first partial information detecting section 22 may perform the above processing of determining as to whether or not the image element concerned is a change-restricted bit only on bits that are determined to be erroneously detected bits when information detected from the input image I1 is subjected to error correction processing (i.e., only on error-corrected bits).

Using results of the above-described processing which has been performed by the first partial information detecting section 22, the rearrangement processing section 24 rearranges pieces of second partial information A2p so as to reduce the differences between the pieces of information currently embedded in the input image I1 and the pieces of information to be embedded there and to reduce the number of change-restricted bits that will be changed in value. In particular, the rearrangement processing section 24 rearranges the pieces of second partial information A2p so that the number of change-restricted bits that will be changed in value does not exceed a predetermined number.

Figure 8:
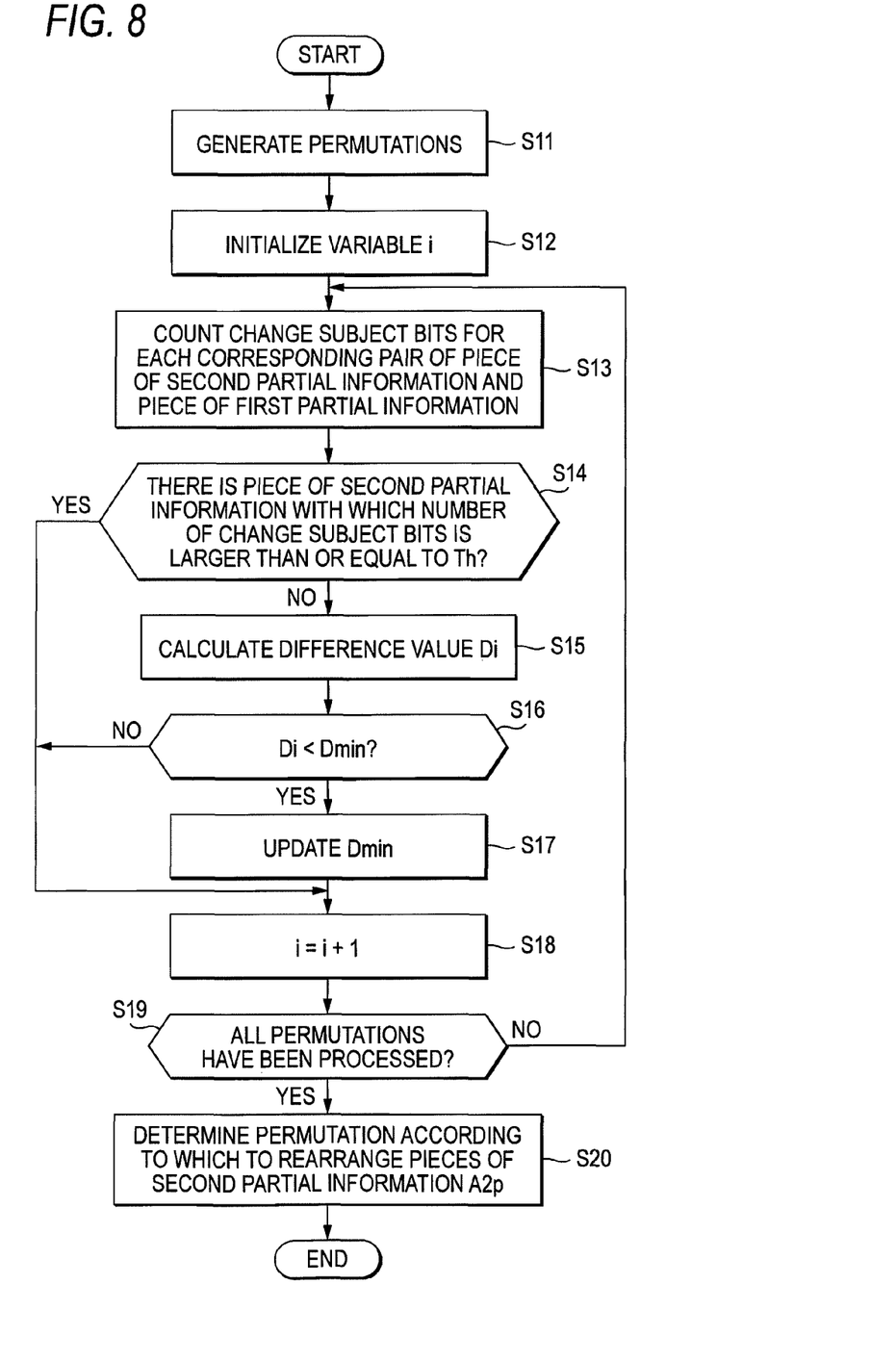
FIG. 8 is a flowchart of another example process that is executed by the image processing apparatus according to the exemplary embodiment of the invention.

The second example rearrangement process will be described below with reference to a flowchart of FIG. 8.

First, as in steps S1 and S2 of the process of FIG. 6, the rearrangement processing section 24 generates permutations of pieces of second partial information A2p at step S11 and initializes variable i to "0" at step S12.

At step S13, the rearrangement processing section 24 compares each of the pieces of second partial information A2p, which have been rearranged according to a permutation having a permutation number being equal to variable i with one, corresponding to the piece of second partial information A2p, of the pieces of first partial information A1p detected by the first partial information detecting section 22. The rearrangement processing section 24 counts change-restricted bits where the piece of second partial information A2p and the corresponding piece of first partial information A1p have different values (hereinafter may be referred to as "change subject bits"). The change subject bits are bits that are to be changed though they are change-restricted bits. At step S14, the rearrangement processing section 24 determines as to whether or not the number of change subject bits in any piece of second partial information A2p is larger than or equal to a threshold value Th. If this condition is satisfied, the processing relating to the permutation indicated by variable i is stopped, and the process proceeds to step S18.

The threshold value Th is set smaller than or equal to an information amount (the number of bits) within which each piece of partial information can be corrected by an error correction code provided therein. More specifically, the threshold value Th may be set at the number of bits that is a prescribed proportion (e.g., ½) of a correctable number of bits. This is because if change-restricted bits were changed in a number that is larger than the correctable number of bits, error correction could not be performed by error correction processing when detection errors occurs in such bits. Even if change-restricted bits are selected as change subject bits, as long as their number is sufficiently smaller than the correctable number of bits, it is highly probable that detection errors occurring in those change subject bits can be corrected by error correction processing unless a large amount of noise or the like is mixed into them.

Then, the rearrangement processing section 24 executes the same steps as steps S3 to S8 shown in FIG. 6. That is, at step S15, the rearrangement processing section 24 calculates a difference value Di for the pieces of second partial information A2p as rearranged according to the permutation having the permutation number that is equal to variable i. At step S16, the rearrangement processing section 24 determines as to whether or not the difference value Di is smaller than a minimum difference value Dmin. If the difference value Di, which was calculated at step S15, is smaller than the minimum difference value Dmin, at step S17 the rearrangement processing section 24 updates the minimum difference value Dmin to the newly calculated difference value Di. At step S18, the rearrangement processing section 24 increments variable i by 1. At step S19, the rearrangement processing section 24 determines as to whether or not all the permutations have been processed. If not all of the permutations have been processed, the process returns to step S13 to execute the loop again for the next permutation. If all the permutations have been processed, at step S20 the permutation that produces the current minimum difference value Dmin is employed as a permutation according which the pieces of second partial information A2p should be rearranged.

The above-described second example rearrangement process prevents an event that a prescribed number or more of change-restricted bits are changed and, as a result, newly embedded pieces of second partial information A2p cannot be restored.

The invention is not limited to the above exemplary embodiments. For example, although in the exemplary embodiment the image processing apparatus 1, the image reading apparatus 2, and the image forming apparatus 3 are separate from each other, they may be integrated to constitute a single copier or the like. Although in the exemplary embodiment the input image I1 (processing subject) is an image that is read by the image reading apparatus 2, the input image I1 is not limited to such an image and may be an image taken by an imaging apparatus such as a camera.

The code image embedding method or the error correction processing algorithm are not limited to the ones used in the exemplary embodiment and may be any of other various methods or algorithms. Although in the exemplary embodiment each bit of a piece of partial information corresponds to one image element, a code image embedding method is known in which one pixel element represents information of plural bits such as 2 bits. In this case, the number of pixel elements that require update may be calculated in the form of a difference value Di by comparing a piece of first partial information A1p and a piece of second partial information A2p for each number of bits that correspond to one image element.

Although in the exemplary embodiment the rearrangement processing section 24 determines arrangement order of all pieces of second partial information A2p, embedding destination unit areas of the pieces of second partial information A2p may be determined by a separate process. For example, the additional information embedding section 25 determines, as reference positions, tentative embedding destinations of the pieces of second partial information A2p that correspond to a case that they are embedded in the respective unit areas in predetermined order. Then, at least part of the embedding destinations of the pieces of second partial information A2 are replaced by other embedding destinations so that the difference value Di becomes small, whereby final embedding destination unit areas of the pieces of second partial information A2 are determined. Also with this process, the pieces of second partial information A2 can be embedded in such unit areas that the differences between the currently embedded first partial information A1 and the second additional information A2 to be embedded is reduced as a whole.

More specifically, the additional information embedding section 25 selects a piece-of-attention of second partial information A2p in order starting from the first second partial information A2p(1) and searches for a embedding destination unit area with which the difference value Di is made smaller than with the tentative embedding destination (reference position) of the piece-of-attention of second partial information A2p. If a embedding destination that reduces the difference value Di is found, the embedding destination of the piece-of-attention of second partial information A2p and its tentative embedding destination (reference position) are interchanged. This process is performed repeatedly while the piece-of-attention of second partial information A2p is selected in order from the pieces of second partial information A2p. In this manner, embedding destination unit areas of the respective pieces of second partial information A2p are determined so that the difference value Di becomes small as a whole.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image acquiring unit that acquires an image in which first additional information is embedded in such a manner that pieces of first partial information obtained by dividing the first additional information are coded and embedded in respective unit areas obtained by dividing the image;

a partial information detecting unit that detects the pieces of first partial information, which are embedded in the respective unit areas of the image acquired by the image acquiring unit; and an embedding unit that codes and embeds, in the respective unit areas, pieces of second partial information obtained by dividing second additional information which is different from the first additional information so that a sum of differences between corresponding pairs of (i) the pieces of first partial information detected by the partial information detecting unit and (ii) the newly embedded pieces of second partial information become minimum.

2. The image processing apparatus according to claim 1, wherein
the embedding unit embeds the pieces of second partial information in the respective unit areas with switching embedding destinations of at least a part of the pieces of second partial information with embedding destinations of other pieces of second partial information so that the sum of differences between the corresponding pairs of (i) the pieces of first partial information detected by the partial information detecting unit and (ii) the newly embedded pieces of second partial information become minimum.

3. The image processing apparatus according to claim 1, further comprising:
a rearranging unit that rearranges the pieces of second partial information so that the sum of the differences between the corresponding pairs of (i) the pieces of first partial information detected by the partial information detecting unit and (ii) the newly embedded pieces of second partial information become minimum when the pieces of second partial information are embedded in the respective unit areas, wherein
the embedding unit generates an image in which the second additional information is embedded by coding and embedding the pieces of second partial information as rearranged by the rearranging unit in the respective unit areas.

4. The image processing apparatus according to claim 3, wherein
the pieces of second partial information are added with respective pieces of identification information that enable identification of positions of the pieces of second partial information in the second additional information, and
the rearranging unit rearranges the pieces of second partial information so that the sum of the differences between the corresponding pairs of (i) the pieces of first partial information embedded in the respective unit areas and (ii) the pieces of second partial information, which are added with the respective pieces of identification information become minimum.

5. The image processing apparatus according to claim 3, wherein
in detecting the pieces of first partial information, the partial information detecting unit determines restricted portions, where a change should be restricted, of the respective pieces of first partial information; and
the rearranging unit rearranges the pieces of second partial information so as to reduce the number of restricted portions where a change is to be made even though the change should be restricted there.

6. The image processing apparatus according to claim 4, wherein
in detecting the pieces of first partial information, the partial information detecting unit determines restricted portions, where a change should be restricted, of the respective pieces of first partial information, and
the rearranging unit rearranges the pieces of second partial information so as to reduce the number of restricted portions where a change is to be made even though the change should be restricted.

7. The image processing apparatus according to claim 5, wherein
the pieces of second partial information contain respective error correction codes to be used in detecting the pieces of second partial information, and
the rearranging unit rearranges the pieces of second partial information so that the number of the restricted portions where the change is to be made even though the change should be restricted becomes smaller than a number that is determined according to an information amount within which information can be corrected by the error correction code.

8. The image processing apparatus according to claim 6, wherein
the pieces of second partial information contain respective error correction codes to be used in detecting the pieces of second partial information, and
the rearranging unit rearranges the pieces of second partial information so that the number of the restricted portions where the change is to be made even though the change should be restricted but becomes smaller than a number that is determined according to an information amount within which information can be corrected by the error correction code.

9. An image processing method comprising:
acquiring an image in which first additional information is embedded in such a manner that pieces of first partial information obtained by dividing the first additional information are coded and embedded in respective unit areas obtained by dividing the image;
detecting the pieces of first partial information, which are embedded in the respective unit areas of the acquired image; and
coding and embedding, in the respective unit areas, pieces of second partial information obtained by dividing second additional information which is different from the first additional information so that a sum of differences between corresponding pairs of (i) the pieces of detected first partial information and (ii) the newly embedded pieces of second partial information become minimum.

10. A non-transitory computer-readable medium storing a program that causes a computer to execute image processing, the image processing comprising:
acquiring an image in which first additional information is embedded in such a manner that pieces of first partial information obtained by dividing the first additional information are coded and embedded in respective unit areas obtained by dividing the image;
detecting the pieces of first partial information, which are embedded in the respective unit areas of the acquired image; and
coding and embedding, in the respective unit areas, pieces of second partial information obtained by dividing second additional information which is different from the first additional information so that a sum of differences between corresponding pairs of (i) the pieces of detected first partial information and (ii) the newly embedded pieces of second partial information become minimum.

* * * * *